United States Patent [19]
Bongiovanni et al.

[11] Patent Number: 4,709,887
[45] Date of Patent: Dec. 1, 1987

[54] HIGHWAY CABLE CLAMP

[76] Inventors: Nicola Bongiovanni, 320 Dixon Road, Apartment 1810, Weston, Ontario, Canada, M9R 1S8; Vincent Cianfarani, 45 Marylin Street P.O. General Delivery, Caledon East, Ontario, Canada, LON 1EO

[21] Appl. No.: 907,076

[22] Filed: Sep. 15, 1986

[51] Int. Cl.$^4$ .............................................. F16L 3/08
[52] U.S. Cl. ........................................ 248/66; 248/71; 256/13.1
[58] Field of Search ............... 248/66, 71, 74.5, 68.1; 411/457; 256/13.1

[56]  References Cited
U.S. PATENT DOCUMENTS

| | | | |
|---|---|---|---|
| 566,544 | 8/1896 | Smith | 248/68.1 |
| 1,529,881 | 3/1925 | Engle | 248/71 |
| 1,651,833 | 12/1927 | Nevius | 248/66 |
| 1,664,321 | 3/1928 | Quist | 248/66 |
| 1,736,807 | 11/1929 | Thomas | 411/457 X |
| 2,263,271 | 11/1941 | Lazarides | 248/71 |
| 3,220,679 | 11/1965 | Larson | 248/74.5 X |

*Primary Examiner*—Andrew V. Kundrat
*Attorney, Agent, or Firm*—Eugene J. A. Gierczak

[57] ABSTRACT

A clamp for supporting a plurality of horizontally spaced highway guard cables against a wooden post, such clamp comprising a plate member presenting a flat portion and a plurality of spaced apart recesses adapted to freely slidingly retain said plurality of highway guard cables against said post respectfully, said plate member including a series of apertures staggered along two opposing edges thereof, said apertures adapted to receive nails for fastening said clamp to said post so as to minimize splitting of said wooden posts.

11 Claims, 6 Drawing Figures

4,709,887

HIGHWAY CABLE CLAMP

FIELD OF INVENTION

This invention relates to highway guard clamps, and in particular relates to clamps for supporting a plurality of horizontally spaced highway guard cables against a wooden post, by utilizing a series of apertures staggered along two opposing edges of said clamp so as to minimize splitting of said wooden posts.

BACKGROUND TO THE INVENTION

Several means or devices for supporting a plurality of guard cables along highways have heretofore been designed.

For example U.S. Pat. No. 1,643,123 relates to a shock absorbing highway guard comprising a series of rigid vertical supports adjacent the side of a highway and, fastened to and extending between the supports, a strip of wire fabric resistingly extensible laterally under impact.

Moreover U.S. Pat. No. 1,860,615 teaches the use of posts having affixed thereto upper and lower clips, where each clip is provided with two eyes which are adapted to receive rivots or other fastening means into the post.

U.S. Pat. No. 1,988,984 discloses the use of a strap sheet metal provided with a series of spaced loops which are adapted to connect the ends of adjacent strips or panels.

U.S. Pat. No. 2,317,249 shows the use of a plate or body member which is formed so as to provide a vertically extending outer face portion having a centrally attached bellied portion, and a clamping member which is formed so as to conform to the outer face portion upon which it is adapted to be disposed. There is formed in the clamping member a plurality of spaced apart substantially U-shaped notches into which the guard cables are adapted to be disposed where the notches are sufficiently large so as to permit relatively free movement of the guard cable therewithin after the clamping plate has been secured to the body member.

Finally U.S. Pat. No. 4,465,263 teaches the use of a web containing wires which is secured to a support by means of a securing staple. The securing staple has three semi-circular bends to accomodate the web, and also presents holes to accomodate nails which secure the staple and the web to the post such that the cables are not freely moveable relative to the staple.

Other arrangements in the prior art utilize flat spacers which include a series of vertically spaced holes which are disposed along a common line and which holes are adapted to receive U-shaped staples. Such U-shaped staples are adapted to embrace horizontally disposed cables when driven through the holes of the spacer into the wooden posts.

The highway cable clamps presently used tend to split the wooden posts particularly when the fastening means driven into the wooden posts are disposed along a common line. Split wooden posts reduce the lifetime and strength of wooden posts.

Moreover, difficulties may be encountered in quality control in driving staples or nails into the wooden posts while embracing the horizontal cables as it is not uncommon for workmen to overhammer the staple against the cable into the wooden posts so as to clamp or pinch the cable between the staples and posts. Such a condition is not desirable as the force of impact of a car against a highway guard fence constructed in such a fashion is not properly dissipated over a series of wooden posts, and it is not uncommon for a post to be prematurely sheared off because the staples do not allow the cables to be freely slidingly retained between the staple or clamp and the wooden post. The pinched cable also hinders the proper tensioning of the cable during installation and routine maintenance. The proper tensioning of the cables is necessary for maintaining the proper height of the cables from the ground.

OBJECTS OF THE INVENTION

It is an object of this invention to provide an improved highway cable clamp for freely slidingly retaining cables against a wooden post.

It is a further object of this invention to utilize highway cable clamps which improve and lengthen the lifetime and strength of wooden posts.

FEATURES OF THE INVENTION

The principal feature of this invention resides in a clamp for supporting a plurality of horizontally spaced highway guard cables against wooden posts, such clamp comprising; a flat plate member presenting flat portions and a plurality of spaced apart recesses adapted to freely slidingly retain the plurality of highway guard cables against such wooden posts, respectively, such plate members including a series of apertures staggered along two opposing edges thereof where said apertures are adapted to receive fasteners for fastening the clamp to the wooden post so as to minimize splitting of the wooden posts.

It is another aspect of this invention to provide a highway guard fence comprising; a series of spaced apart vertically disposed wooden posts, a plurality of horizontally spaced highway guard cables anchored at the opposite ends thereof, and clamps comprising plate members presenting flat portions and a plurality of spaced apart recesses adapted to freely, slidingly retain the plurality of highway guard cables against such wooden posts, respectively, said flat portions including a series of apertures staggered along two opposing edges thereof, said apertures adapted to receive nails for fastening the clamp to the wooden post so as to freely slidingly retain said plurality of cables within said plurality of recesses, respectively, and to minimize splitting of said wooden posts.

DESCRIPTION OF THE DRAWINGS

These and other objects and features are illustrated and described in the following specification to be read in conjunction with the sheets of drawings in which.

DESCRIPTION OF INVENTION

Identical parts have been given identical numbers throughout the Figures.

Figure 1:
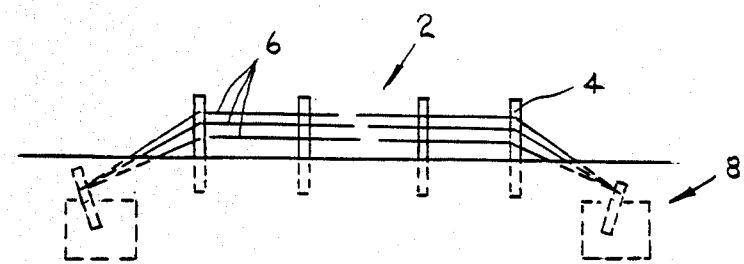
FIG. 1 is a front elevational view of the highway guard fence.

FIG. 1 illustrates a highway guard fence as 2 which comprises of a series of vertically disposed wooden fence posts 4 which have been driven buried and embedded into the ground, and a series of horizontally spaced highway guard cables 6 which are anchored by suitable means (not shown in detail) 8 at opposite ends of said guard cable 6.

Figure 2:
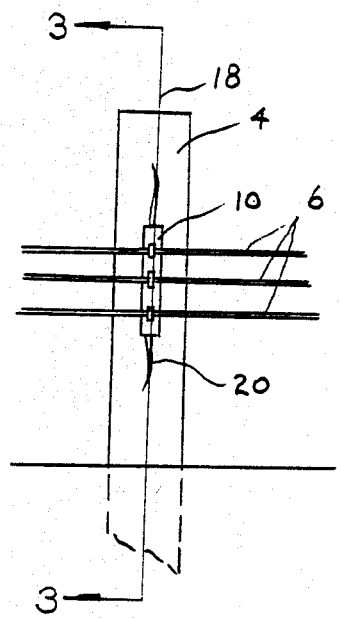
FIG. 2 is a front elevational view showing the use of staples and spacers of the prior art which tend to split wooden posts.
Figure 3:
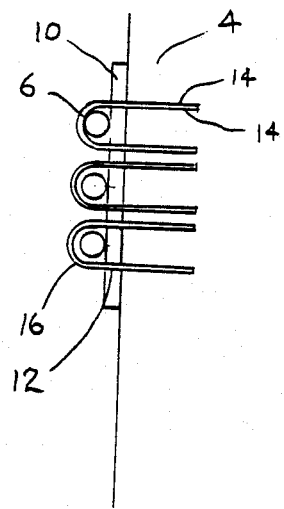
FIG. 3 is a cross-sectional view along the lines of 3—3 shown in FIG. 2.

FIGS. 2 and 3 illustrate the system presently used in the prior art, namely the use of a spacer 10 which contains a series of holes 12 which are adapted to receive the legs 14 of a U-shpaed staple 16 driven into the wooden fence posts 4. The staple 16 support the highway cable 6 between staple 16 and post 4.

As best illustrated in FIG. 2, the holes 12 in the spacer 10 of the prior art are disposed along a common line 18 which tend to cause the wooden fence posts 4 to split as illustrated by numeral 20.

And furthermore the installer frequently has difficulty in controlling th force of driving the staple 16 into the wooden fence post 4, and it is not uncommon for the installer to over hammer the staple 16 into the wooden fence post 4 so as to pinch or clamp the cable 6 between staple 16 and post 4. If a car (not illustrated) hits a highway guard fence 2 having such a condition it is not uncommon for the wooden fence post 4 having such pinched cable 6 to bear the brunt of the force of impact thereby causing the wooden fence post 4 to prematurely shear off. Furthermore the sheared wooden post 4 may still be "hooked" connected or clamped to the cable 6 and may thereby hit the car causing further damage.

Moreover, if the force of impact does not shear wooden fence post 4, it is also likely that if only some of the staples 16 pinch cables 6, while others do not, such pinched staples may be ripped away from said post 4 thereby prematurely releasing cables 6 from post 4, requiring later repair.

Figure 4:
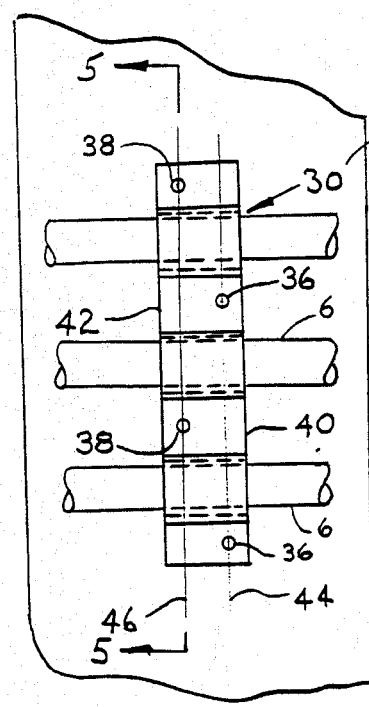
FIG. 4 is a front elevational view of said clamp against a wooden post.
Figure 5:
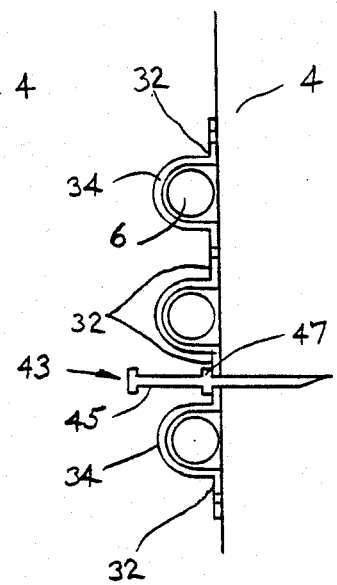
FIG. 5 is a cross-sectional view taken along the line 5—5 of FIG. 4.
Figure 6:
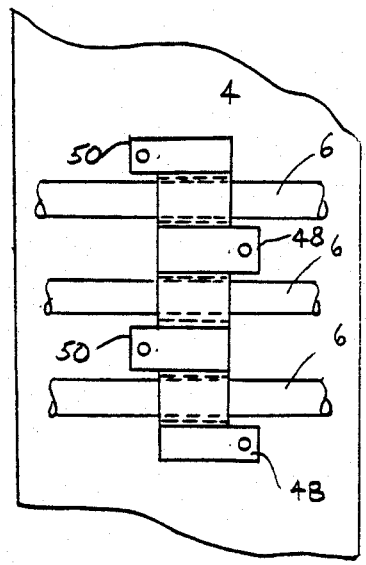
FIG. 6 is a front elevational view of a second embodiment of said clamp.

FIGS. 4 to 6 illustrate the invention which minimizes the problems referred to.

FIG. 4 illustrates clamp 30 which is manufactured from galvanized steel or stainless steel. In the preferred embodiment the clamp 30 is comprised of 1.01 millimeter thick galvanized steel or type 304 stainless steel, or as warranted by the Highway authorities. It is also possible that such clamp may be manufactured from other materials such as plastic.

The clamp 30 presents flat portions 32 and recesses 34 which are generally U-shaped in cross-section as best illustrated in FIG. 5.

Recesses 34 are adapted to freely slidingly retain cable 6.

Flat portions 32 present a series of apertures 36 and 38 which are staggered along the two opposite vertical edges 40 and 42 respectively. The apertures 36 and 38 are adapted to receive fasteners 43 such as nails or the like which are driven into the wooden post 4 as best illustrated in FIG. 5. The nails 43 are configured so as to include a long head 45 having a shoulder 47 which is adapted to bear against flat portion 32. The configuration of nails 43 is shown in FIG. 5 minimizes the possibility of accidentally hitting recesses 34 while hammering. It is also possible to use regular nails provided the size of the flat portions 32 are large enough to a accommodate the size of the head of a hammer without accidentally hitting recesses 34. The clamps 30 are installed so as to allow sufficient clearance for the cables 6 to be pulled through the recesses 34 during tensioning.

In the preferred embodiment the nails are two and one-half inches long and comprised of galvanized Ardox (trade mark) nails, or as warranted by the Highway authorities.

As best seen in FIG. 5 the recesses 34 are dimensioned so as to slidingly receive the cables 36. Therefore if a car impacts the highway guard fence 6, the cable 6 freely slidingly move within the recesses 34 of clamps 30 and flex or stretch so as to absorb the impact forces of the car. Such impact forces are therefore transferred by the cable 6 over several wooden posts 4 thereby reducing the likelihood of prematurely shearing the wooden posts 4.

Furthermore by staggering the apertures 36 and 38 about two common lines 44 and 46 respectively rather than one line 18 as in the prior art, the chances of causing the wooden posts to split are further minimized.

The clamp 30 of the invention described herein may also be used with wooden posts 4 which have already been previously split. In such arrangement, the clamp 30 is disposed vertically adjacent the post 4 so that the apertures 36 and 38 respectively straddle the split 20. The nails 32 are then driven into the wooden posts 4 which nails 43 tend to create opposing pressure in the grain of the wood 4 so as to tend to reduce the growth of the split 20.

FIG. 6 illustrates a second embodiment of the invention wherein the flat portions 32 project outwardly beyond the U-shaped recesses 34 so as to be used with wooden posts 4 which have particularly wide splits 20.

More particularly flat portions 32 present projections 48 along edge 40 and projections 50 along edge 42 respectively which are staggered. The clamp 30 shown in FIG. 5 may be curved in cross-section so as to conform to the surface of a rounded wooden post 4.

The projections 48 and 50 present apertures 36 and 38 respectively.

The invention as described herein reduces the tendency to split wooden posts 4, reduces the tendancy for prematurely shearing of wooden fence posts 4 upon impact by a car, and reduces the tendancy of premature release of the cable 6 away from the wooden posts 4.

By utilizing the invention herein described the total number of projections into the wooden fence post 4 has been reduced from 6 (as described in FIGS. 2 and 3) to 4. Furthermore the distances between apertures 36 have been increased compared to the distances between holes 16 of the prior art again tending to minimize the creation of splits 20.

It has also been noted by the inventor herein that it has been possible to reduce the diameter of the fastener or nails 43 projected into the wooden fence posts 4 from 5.8 millimeters (which is currently being used in the prior art described in FIGS. 2 and 3) to 2.59 millimeters or as warranted by the Highway authorities; while still improving the strength characteristics of the fence 2 and minimizing the growth of splits 20 in the wooden fence post 4.

The clamp 30 also automatically provides a space for cables 6 to be freely, slidingly retained in the recesses 34 so as to minimize the possibility of faulty human installation.

Although the preferred embodiment is well as the operation has been specifically described in relation to the drawings, it should be understood that variations of the preferred embodiment could easily be anticipated and achieved by a skilled man in the trade without departing from the spirit of this invention. Accordingly this invention should no be understood to be limited to the exact form revealed in the drawings.

The embodiments of the invention in which an exclusive property or privilege is claimed are defined as follows:

1. A clamp for supporting a plurality of horizontally spaced highway guard cables against a wooden post, said clamp(s) comprising; a plate member presenting flat portion and a plurality of spaced apart recess means adapted to freely sliding retain said plurality of cables, respectively, against said post(s), said flat portions including a series of aperture means staggered along two opposing edges thereof, said aperture means adapted to receive (fastening means) a nail for fastening said clamp to said post so as to minimize splitting of said wooden post(.); each said nail including a head at one end thereof and a shoulder, whereby said head is adapted to extend beyond said recess means when said shoulder bears against said flat portion.

2. In a clamp as claimed in claim 1 wherein said staggered aperture means are disposed along the vertical opposing edges of said flat portions.

3. In a clamp as claimed in claim 2 wherein said recess means are "U shaped" in cross-section.

4. A clamp for supporting a plurality of horizontally spaced highway guard cables against a wooden post having a vertical split, said clamp comprising; a plate member presenting flat portions and a plurality of U-shaped spaced apart recess means adapted to freely slidingly retain said plurality of cables, respectively, against said post, said flat portions including a series of aperture means staggered along two vertical opposing edges thereof, said aperture means adapted to receive nails to be driven into said wooden post for fastening said clamp to said post, said clamp adapted to be disposed adjacent said split so that said clamp and said staggered series of aperture means along said opposing edges of said flat portions straddle said split and improve the strength characteristics of said wooden posts.

5. In a clamp as claimed in claim 4 wherein said recess means are located between said flat portions.

6. In a clamp as claimed in claim 5 wherein said flat portions project outwardly beyond said U-shaped recess means, and said aperture means are located within said projected flat portions.

7. In a clamp as claimed in claim 6 wherein only one edge of said flat portions project outwardly beyond said U-shaped recess means.

8. In a clamp as claimed in claim 7 wherein opposite edges of adjacent flat portions project outwardly beyond said U-shaped recess means.

9. In a highway guard fence comprising:
 (a) a series of spaced apart vertically disposed wooden posts;
 (b) a plurality of horizontally spaced highway guard cables anchored at opposite ends thereof;
 (c) clamp means presenting flat portions and a plurality of spaced apart recess means adapted to freely slidingly retain said plurality of highway guard cables against said posts respectively, said flat portions including a series of aperture means staggered along two opposing edges thereof, said aperture means adapted to receive nails for fastening said clamp means to said wooden posts so as to freely retain said plurality of cables within said plurality of recess means, respectively, and to minimize splitting of said wooden posts.

10. A clamp for supporting a plurality of horizontally spaced highway guard cables against a wooden post, said clamp comprising; a plate member presenting flat portions and a plurality of spaced apart recess means adapted to freely slidingly retain said plurality of cables, respectively, against said post, said flat portions including a series of aperture means staggered along two opposing edges thereof, whereby, each said flat portion includes only one aperture means in the vicinity of one edge thereof, and said next adjacent flat portion includes only one aperture means in the vicinity of said opposite edge thereof, said aperture means adapted to receive fastening means for fastening said clamp to said post so as to minimize splitting of said wooden post.

11. A clamp comprising a plate member bent so as to present flat portions at either end thereof and a plurality of spaced apart U-shaped recess means intermediate said ends of said plate, said U-shaped recess means joined by intermediate flat portions, whereby opposite edges of adjacent flat portion project outwardly beyond said U-shaped recess means and each said projected flat portion presents an aperture means.

* * * * *